May 24, 1938.  A. C. LOEDDING  2,118,254
AIRCRAFT
Filed May 18, 1933  4 Sheets-Sheet 1
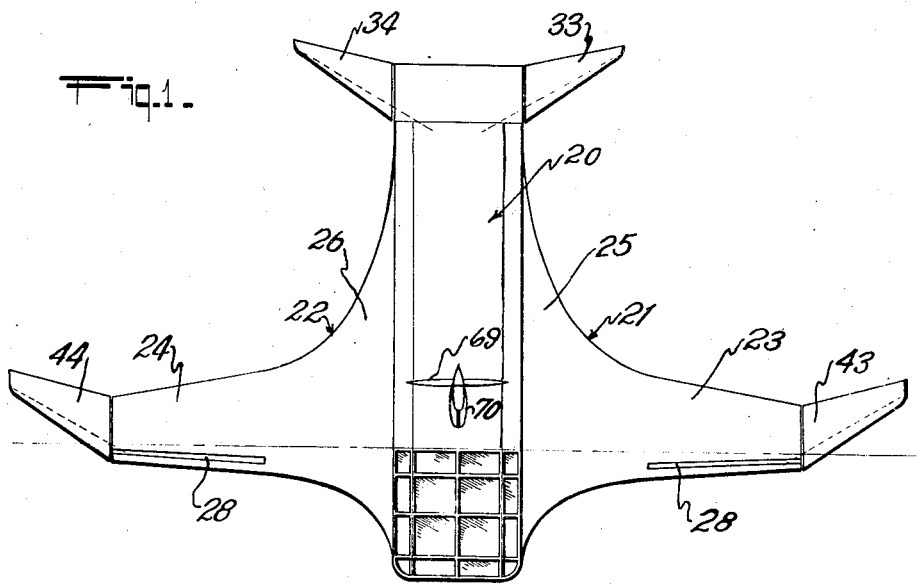
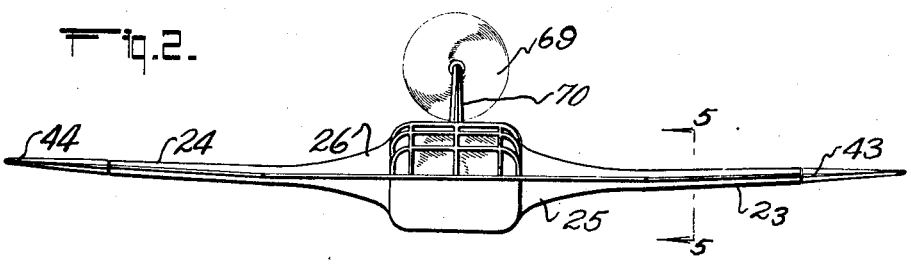
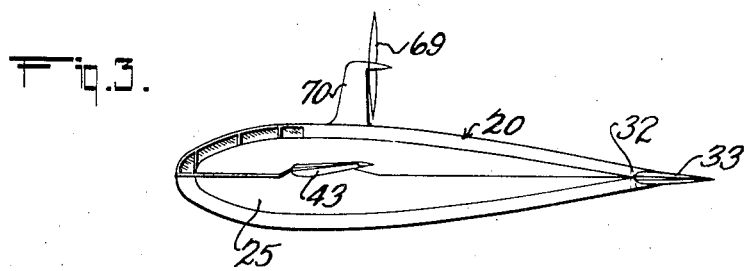
INVENTOR
Alfred C. Loedding
BY Warfield & Brown
ATTORNEYS May 24, 1938.  A. C. LOEDDING  2,118,254
AIRCRAFT
Filed May 18, 1933  4 Sheets-Sheet 2
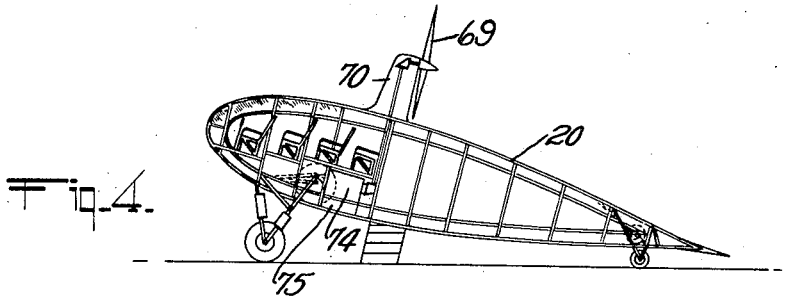
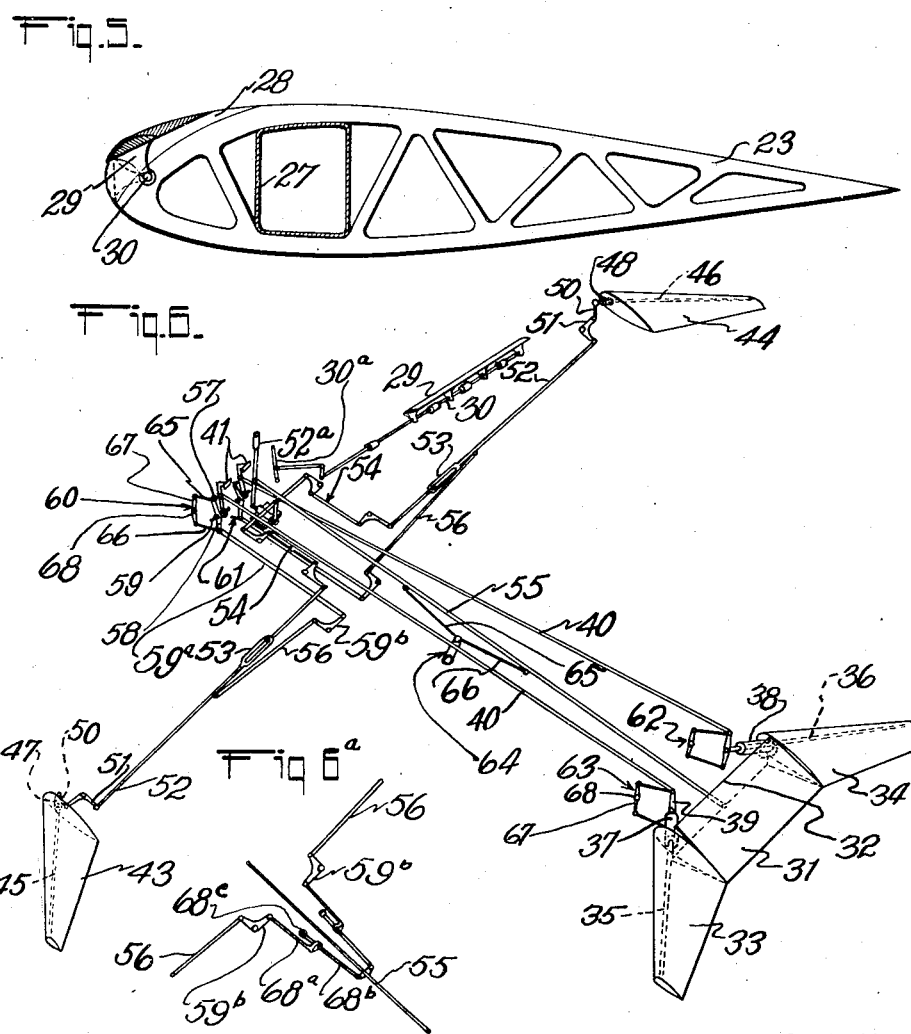
INVENTOR
Alfred C. Loedding
BY Warfield & Brown
ATTORNEYS May 24, 1938.  A. C. LOEDDING  2,118,254
AIRCRAFT
Filed May 18, 1933  4 Sheets-Sheet 3

INVENTOR
Alfred C. Loedding
BY Warfield & Brown
ATTORNEYS

May 24, 1938.　　　A. C. LOEDDING　　　2,118,254
AIRCRAFT
Filed May 18, 1933　　　4 Sheets-Sheet 4

INVENTOR
Alfred C. Loedding
BY Warfield & Brown
ATTORNEYS

Patented May 24, 1938

2,118,254

UNITED STATES PATENT OFFICE 2,118,254

AIRCRAFT

Alfred C. Loedding, New York, N. Y.

Application May 18, 1933, Serial No. 671,624

9 Claims. (Cl. 244—36)

This invention relates to aircraft, and particularly to aircraft adapted to be supported aerodynamically in whole or in part.

In general, an object of the invention is the provision of an aircraft having a high degree of safety and efficiency.

A more specific object of the invention is the provision of an aircraft that effectively fulfills the commercial and military requirements for safe, efficient and fast flying, including the taking off and landing of the aircraft under adverse conditions.

A further object is the provision of an aircraft which can be efficiently flown and which can be effectively controlled.

Among the objects of the invention are the provision of an aircraft which will satisfy the commercial requirement for large size planes unusually well; the provision of improved control members for aircraft; the provision of improved constructional features permitting an increase in the slope of the lift curve when desired; and the provision of various constructional features adapted for use in different types of aircraft.

Other objects of the invention will in part be obvious and will in part appear hereinafter.

The invention accordingly comprises the features of construction, combination of elements, and arrangement of parts, which will be exemplified in the construction hereinafter set forth and the scope of the application of which will be indicated in the claims.

For a fuller understanding of the nature and objects of the invention, reference should be had to the following detailed description taken in connection with the accompanying drawings, in which:

Figure 1 is a plan view of an engine-propelled airplane embodying the invention, showing the same in flight;

Fig. 2 is a front view thereof;

Fig. 3 is a side view thereof;

Fig. 4 is a lateral central section of the airplane showing the same at rest;

Fig. 5 is a sectional view of the wing of the plane along the line 5—5 of Fig. 2;

Fig. 6 is a perspective view of the plane showing the control members and operating mechanism therefor in skeleton form;

Fig. 6a is a similar view showing a portion of a modified type of control-operating mechanism;

Figure 7:
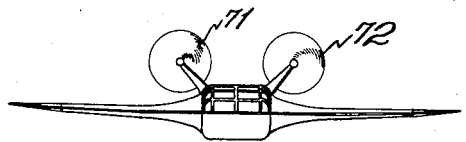
Fig. 7 is a front view of a similar plane on a reduced scale showing a different propeller position.

A difficulty in the construction of airplanes to satisfy modern requirements lies in the fact that the design of ordinary airplanes is such that the flying efficiency decreases with an increase in Reynolds number, i. e., with the length of the plane and/or the relative movement of the plane and the air. In general terms, this means that the efficiency of common plane designs decreases as their size and speed increases.

Another distinct drawback in common types of planes is the lack of coordination in the various parts of the plane. Moreover, even in planes which are designed with a particular eye to the flying efficiency, it is common practice to so construct the body portion or fuselage that it does not add any great amount of lift to the plane, so that the body portion greatly increases the parasite drag without materially assisting in the lift.

A further difficulty lies in the fact that there is usually a considerable variation in the center of pressure of aircraft at different angles of attack so that the maximum control by the pilot over the plane both in flying and landing is not attained. In other words, a plane wherein the center of pressure is properly placed when the angle of attack is low, as at a high speed, will have a center of pressure which is very badly placed when its angle of attack is high, as in taking off, landing or at low speeds; and a plane wherein the center of pressure is most efficiently placed for low speeds is poorly balanced when being driven at a high speed with a low angle of attack.

With the foregoing and other problems in view, the present invention contemplates the provision of an airplane wherein the wing and body sections are both designed so as to produce a safe and efficient structure whose efficiency increases rather than decreases with an increase in the Reynolds number.

In accordance with the invention there is provided an aircraft with wing and body portions each shaped to provide an efficient airfoil, the upper and lower cambers of these airfoils being substantially symmetrical. Such a symmetry results in an increase in efficiency with increase in Reynolds number with the result that there may be provided an aircraft which will satisfy modern requirements of size and speed to a marked degree.

Another feature of the invention is the construction and relative positioning of the wing and body portions so that the points of center of pressure at any adjacent chords do not vary greatly; a particularly desirable construction being one whereby points of center of pressure of the various chords fall in a substantially continuous line. It is to be noted that a plane wherein the wing and body portions are symmetrical throughout is particularly well adapted for the inclusion of this feature.

Another feature of the invention resides in fairing the wing portions into the body portions in such a manner as to provide a minimum of resistance or tendency to produce eddies consistent with other factors.

Among the other features of the invention are the provision of a construction such that a flow of air beneath a small section at the upper nose portion of a flying portion or airfoil section may be provided during abnormal conditions in a wing which has a desired unbroken contour under normal conditions; and the provision of strong control members which can be moved with very little effort and which interfere with smooth flying to an unusually small extent.

The foregoing and various other features will be pointed out in connection with the following detailed description of a few of the many forms of engine-propelled aircraft, soaring planes, rocket craft, etc. which may be produced in accordance with the invention.

In Figs. 1 to 6, inclusive, there is exemplified a form of passenger transport plane which embodies the invention. The plane in essence embodies three airfoils so coordinated and merged as to provide substantially a "flying wing". These airfoils comprise a body portion 20 and two wing portions 21 and 22 which are so faired that substantially all peripheral lines on the plane are smooth except where they cross the rear edge of one of the airfoils. Each of the airfoils is symmetrical in longitudinal section about its chord, so as to provide high lift efficiency and low profile drag, which increase and decrease respectively with increase in speed, and a small relative profile drag at a variety of angles of attack. In the exemplified construction, moreover, the point of center of pressure in each chord throughout all three airfoils falls in a continuous line, which in the present instance is substantially straight, but which may be curved rearwardly toward the tip of the wings, if other factors make this desirable. The construction thus provided, in addition to the advantages above enumerated, may be flown efficiently at small angles of attack, has a substantially constant or limited center of pressure movement, can be braced by a single transverse spar, has a steep slope of lift curve which gives good lateral stability, limits burbling, has only a mild burbling at the stalling point, permits ready flying under ice-forming conditions, and the effective use of windshield wipers when necessary, and is ideally suited for various constructional designs, some of which will be indicated hereinafter.

It is to be noted that the contour of the particular plane exemplified is such that the leading edge is a small arc of a circle which merges into the sides of half of an ellipse, which at about the point of greatest thickness merges into sweeping curves which terminate at the rear edge of the section at which the plane is viewed.

It is further to be noted that whereas the outer sections 23 and 24 of the wings have straight edges, the inner portions 25 and 26 are faired smoothly into the body portion so that substantially all the peripheral lines running about the plane in any of various directions will be smooth, except where they cross the trailing edge of a wing or the body. Furthermore, the rear or trailing edge of each wing forms a concave curve, particularly along the inner portions, when the aircraft is seen in plan (see Fig. 1). This gives a relatively high-aspect ratio.

The front and rear edges of the wing portions, moreover, are so defined that a chord taken at any point will have about 25% of its length forwardly of a continuous, and, in the present instance, substantially straight line. Both the wings and body are so formed that their points of center of pressure fall on this line. While it is not essential that the wing and body portions be so designed that the points of center of pressure of any chord will lie on a continuous line from wing tip to wing tip, it is nevertheless a highly important feature in the provision of a plane having the maximum efficiency and safety. When this line of center of pressure is straight the plane may be sturdily braced in a simple and effective manner. Spars 27 may be disposed in the wing portions and suitably anchored to the bracing members for the wing and body portions, so as to provide a maximum of support on the line on which the plane is balanced and to limit the torsional strain.

It will be understood that the particular curves of the fairing sections 25 and 26 need not follow those illustrated. It is desirable, however, that the curves swing rearwardly from the nose a sufficient distance to allow satisfactory visibility for the pilot, that ample wing spread be provided, and that tendencies toward the formation of eddies be avoided as much as may be consistent with other factors.

The points of maximum thickness along any chord are about thirty per cent. of the distance rearward of the leading edge.

It is further to be noted that because of the shape of the plane and its simplicity and strength, it is admirably adapted for landing in rough water, sand, mud, snow, ice and high grass. As will be seen by reference to Figs. 4 and 6, the control section is located in the forward part of the central airfoil portion which will permit the maximum of visibility. At the same time the contour of the plane is such that there is no built-up pressure which will interfere with the operation of mechanical windshield wipers or will cause snow or ice to gather at any point on the visibility surfaces.

Another feature of the invention which is embodied in the form of construction illustrated in Figs. 1 thru 6 is the provision of a valve-controlled upwardly and rearwardly extending slot at the leading edge of a flying portion, such as a portion of each wing, for the purpose of washing away eddies, increasing the slope of the lift curve, and flattening out the lift without interfering with the efficiency of the plane under normal cruising conditions. In the present instance, slots indicated at 28 extend upwardly and rearwardly from the leading edges of the wing sections 23 and 24 to provide an increase in angle of attack with safety in taking off, landing, flying in the rarefied air of high altitudes, etc. The air sweeping thru the slots and thence over the top of the plane reduces eddies and burbling, increases the slope of the lift curve, and enables landing in the stalled condition. In order to close the slots during normal cruising conditions there is provided a valve 29 carried on a pin 30 operated by a lever 30ᵃ under control of the pilot, and/or, if desired, by automatic means. It is to be noted that the edge of the valve member 29 is curved so that when it is in operative position, as shown in dotted lines in Fig. 5, the curvatures at the nose of the wing sections 23 and 24 are substantially the same as the curvatures at the nose throughout the other portions of the plane. As indicated, the sections 23 and 24 have straight leading and trailing edges so that the valve heads 29 may be plate-like members.

A construction such as that illustrated may be controlled in any conventional or other desired manner. There are exemplified however in connection with this showing control means of a particularly desirable type which, as shown, are especially adapted for use in connection with aircraft of the type under consideration.

At the rear of the body portion 20, there is provided an element 31 pivoted at 32, which is to be used as an airbrake or flap to reduce the landing speed in landing in restricted areas and on each side of this portion there are provided yawing control members 33 and 34, each extending outwardly and rearwardly in the present instance, and adapted to be swung on a laterally-extending axis. Desirably, as exemplified, these control members have a definite thickness and are symmetrical about their chords so that their shape is generally similar to the shape of the wing and body portions of the exemplified device. It has been found that particularly effective control is secured when these axes extend along the lines of center of pressure of the control members, since the control member, while normally maintaining the same angle of attack as an airplane, may be readily swung from such position in order to steer the plane. Such positioning of the axes markedly reduces the flutter or vibration which would be caused by turbulent flow and also eliminates torsional strain.

Any of a variety of types of control operating mechanism may be utilized, as desired.

In the present instance the control members 33 and 34 are mounted on rods 35 and 36 which extend along the line of center of pressure of the control members and are arranged to be rotated in sleeves 37 and 38 carried by the body of the plane. Each rod carries a lever 39 from which there extends a control rod 40 connected with one of a pair of pedals 41 at the pilot seat, so that the control members may be operated individually or together as desired.

In the present instance similar control members are also utilized at the tip of the wings for effecting turning movement. These control members are exemplified at 43 and 44 as extending outwardly and rearwardly, although they may extend directly outwardly if desired. They are mounted on rods 45 and 46 respectively which are rotatably held in sleeves 47 and 48. Each rod is arranged to be rotated through the medium of a link 50, a bell crank lever 51, and an arm 52. Each arm is connected to the control stick 52ᵃ through the medium of a lost-motion connection 53 and link work 54. Hence, as is obvious from the drawings, when the control stick 52ᵃ is moved laterally, both of the rods 54 move longitudinally but in opposite directions. That rod 54 which moves forward, moves that aileron which is associated therewith (either 43 or 44) upward. The other rod 54 which moves backward fails to move the other aileron due to the lost-motion device 53. An arm 55 running rearwardly from the control stick is connected to the elevator 31 to permit the same to be raised or lowered by rearward or forward movement of the control stick. In order to permit the control members 43 and 44 to be utilized together with the control members 33 and 34 for landing, there is utilized link work running from a pressure element 57 below each pedal 41. This link work includes a rod 56 attached to the arm 52 at a point beyond the lost motion connection 53. This link work also includes a bell-crank lever 58 pivoted at 59, a rod 59ᵃ, and a further bell-crank lever 59ᵇ to which the rod 56 is attached, so that when the pedal 41 has been depressed sufficiently to contact the perssure element 57, the bell-crank lever 58 will be swung and the rod 52 drawn inwardly to operate the wing tip control member. The provision of the lost motion connection 53 prevents this operation from affecting position of the control stick. Accordingly, the rear control members may normally be independently operated by the individual movement of the pedals, and the wing tip control members may be independently operated normally by the lateral movements of the control stick. When, however, it is desired to increase the angle of attack to put the craft in stalled position for landing, it is only necessary to depress the two pedals fully.

The deflection of the lateral control members produces a zooming moment and an aerodynamic effect which will materially increase the lift range, reduce burbling, and delay the stall. The result will be a relatively flat lift curve aft the burble point or lift curve peak which is a necessary condition to effect a slow and safe landing.

It is to be noted that the rods 45 and 46 providing the axes for the wing tip control members 43 and 44 extend along the lines of center of pressure of these control members, with the advantages, including the reduction of flutter tendencies and of torsional strain, such as above noted in connection with the positioning of the rods 35 and 36. It is further to be noted that by making the inner edge of the control members 33, 34, 43 and 44 parallel to the longitudinal axis of the plane, rather than at an angle thereto, the resistance to forward movement and the tendency toward eddying is materially decreased.

In order to provide stiffness in the control members there may be provided bungee arrangements 60, 61, 62, 63 and 64, each of which may comprise a pair of rubber strands 65 and 66 extending between a centrally pivoted element, such as 39, 55, or 58, forming a part of the link work in question, and a fixed lever 67. Preferably, the fixed lever may be centrally pivoted but normally held against movement as by a nut 68 so that upon releasing the nut the position of the lever 67, and consequently the respective tensioning of the rubber strands, may be adjusted.

Instead of having the simultaneous operation of the wing tip control members result from the latter part of the pedal movement they may be operated by the latter part of the forward movement of the control stick. In this case the members 57, 58 and 59a are eliminated. A rod 68a extends rearwardly from each bell crank lever 59b, and encircles a rod 68b having a head 68c at its forward end, its rear end being attached to the rod 55. When the rearward movement of the control stick is sufficient to bring the head 68c in contact with the encircling end of the rod 68a the lever 59b and the wing tip members 43 and 44 are swung. Preferably, these are not swung all the way, so that banking and steering is still possible.

Both the absence of fin, rudder or other vertical surfaces, and the contour of the plane itself, assist in permitting a flat spin of sufficient R. P. M. so as to materially reduce the vertical velocity and decrease the impact when the craft strikes the ground. The provision of a centrally-disposed propeller obviously does not materially affect the flat spin rotation. The wing tip controllers capable of producing a yawing and elevator effect in conjunction with the rear yawing and elevator surfaces will give a positive and effective control in either the flat or the tail spin. The pilot will be able to go into or out of the spin at will. The absence of vertical control surfaces will also reduce drift to a minimum when flying in a cross-wind, and will markedly increase the stability in squalls or gusty weather.

Figure 8:
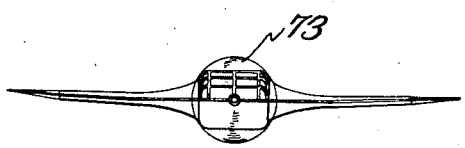
Fig. 8 is a similar view showing a conventional propeller position.

As exemplified, the plane is shown as equipped with a propeller 69 carried on a standard 70 disposed somewhat behind the point of maximum thickness on the body portion. By so placing the propeller such tendency toward burbling above the rear of the body portion (i e., at the top side of the trailing edge) as may exist even in the form of plane exemplified is further counteracted by the draft of air from the propeller. Other propeller arrangements may be utilized, however. One desirable form of propeller arrangement is shown in Fig. 7, wherein two propellers 71 and 72, each disposed over one of the faired sections of the wing portions at a point at the rear of the center of pressure are utilized. With this arrangement the propellers act to deaden such eddies as are set up by the change in slope at the junction of the body and wing portions. If it is not desired to utilize a propeller above the ship, the propeller may be conventionally arranged at the front of the ship, as illustrated at 73 in Fig. 8.

In order to assist in the provision of a well-balanced plane, the engine 74 and gas tanks 75 may be positioned centrally of the plane as shown in Fig. 4 and the cargo space so arranged that the center of gravity of the plane may be slightly in advance of the center of pressure or coincide therewith.

Figure 9:
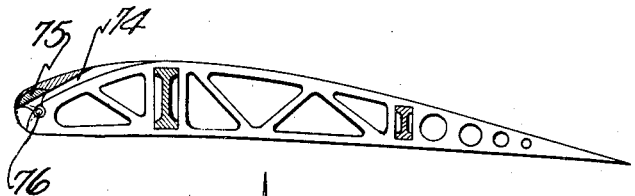
Fig. 9 is a view similar to Fig. 5 showing a conventional wing formed with a slot in accordance with the invention.

Wing sections having upwardly and rearwardly extending slots at their leading edges may be utilized in a wide variety of types of planes, and there is illustrated in Fig. 9 a longitudinal section on a conventional wing portion formed to provide a slot 74a adapted to be closed by a plate 75a, except when a stall condition is approached. At such time the plate 75a may be manually or automatically rotated on a pivot 76 to the position shown in Fig. 9 to open the slot, whereupon air sweeping through the slot will tend to smooth out the eddies above the upper camber of the wing and obtain results of the nature indicated in connection with the slot 28. It is to be noted that here, as in the case of the slot 28, the slot is within the wing proper so that the normal contour of the wing is not interferred with except when the slot is open.

Figure 10:
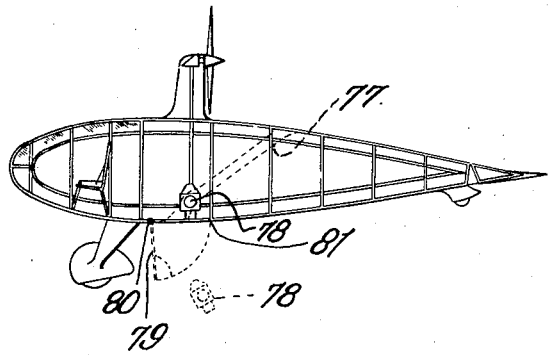
Fig. 10 is a lateral sectional view of another form of engine-propelled airplane embodying the invention.

In Fig. 10 there is illustrated a form of plane having a special cooling means for the engine and particularly adapted for trans-oceanic flying by a single pilot or when gasolene leakage or engine stoppage prevents further engine operation by the provision of an upwardly and rearwardly extending slot 77, which is adapted to carry air over the heated parts of the engine, an easy cooling of the engine is effectuated. Similar means may be utilized in the cooling of engines of other planes, as for example the plane shown in Fig. 1. In the event of fuel or engine failure during long flights the engine becomes a dead weight. A plane such as exemplified, however, is well adapted for use as a soaring plane because of its effectively designed contours. With the dead weight of the engine eliminated it may be soared until landing is possible. Accordingly, the engine 78 is loosely mounted on a floor board 79 hinged at 80 and releasably secured at 81 so that when the fuel is exhausted the securing means 81 may be released, the engine permitted to fall off, and the floor board drawn back into place.

Figure 11:
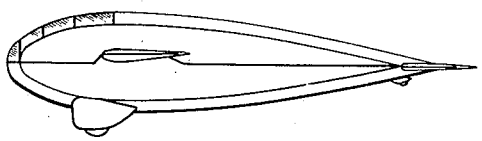
Fig. 11 is a side view of a soaring plane embodying the invention.
Figure 12:
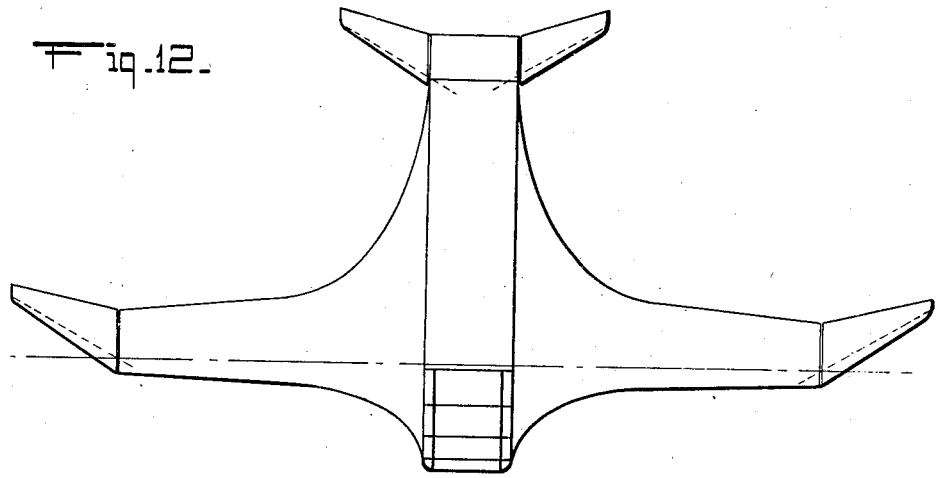
Fig. 12 is a plan view thereof.

Figs. 11 and 12 illustrate the manner in which soaring planes may be constructed in accordance with the invention.

Figure 13:
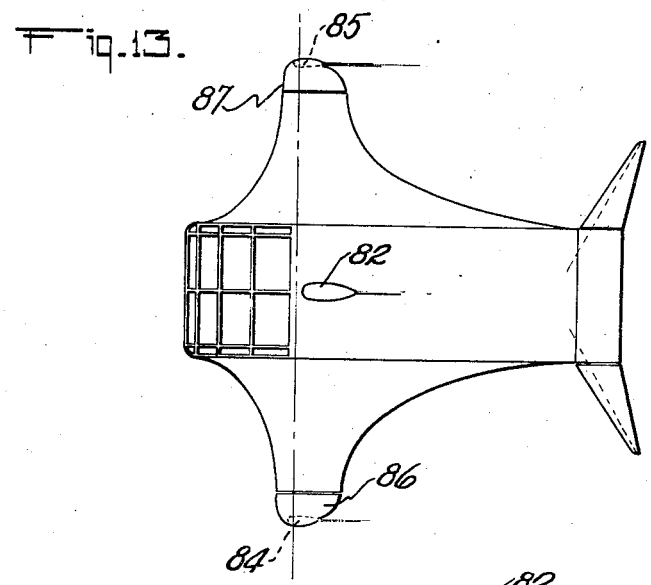
Fig. 13 is a plan view of a rocket plane embodying the invention.
Figure 14:
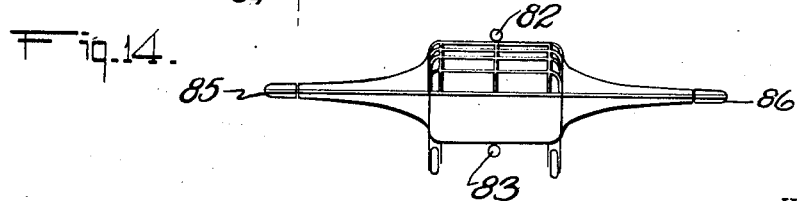
Fig. 14 is a front view thereof.

Figs. 13 and 14 illustrate how rocket planes may be constructed in accordance with the invention. It is to be noted that propulsion members are disposed about the plane as at 82, 83, 84 and 85, so that the plane may be steered in a desired direction by cutting out or otherwise limiting the effect of one or more of the propulsion members. It is also to be noted that the propulsion members 84 and 85 are carried on wing tip control members 86 and 87, so that their direction of action may be changed to facilitate the steering. With the propulsion members 84 and 85 cut out, the control members 86 and 87 may be utilized in the same manner as the control members 43 and 44, the present exemplification illustrating a form of construction in which such control members extend directly outwardly from the wing portions rather than outwardly and rearwardly as in Fig. 1.

As above indicated, the invention is not limited to machines which derive their entire lift from aerodynamic action, but contemplates the provision of aircraft having more or less buoyancy as desired.

It will be seen that the invention permits the provision of an aircraft having a high value of lift with respect to drag at various angles of attack; wherein there is a high aerodynamic efficiency; wherein the efficiency increases with the Reynolds number, lowering the profile drag, increasing the slope of the lift curve and lift range, and giving a relatively flat lift curve peak, resulting in relatively mild stalling characteristics; wherein external bracing is eliminated and parasite resistance reduced, and structural strength, simplicity, visibility and maneuverability increased; wherein control may be effectively exercised from negative to large positive angles of attack beyond the stall, and in various maneuvers including the flat spin and the tail spin; wherein the center of pressure may remain constant in the airfoil sections throughout various angles of attack, and will occur near the point of maximum thickness so as to permit desirable spar depth; wherein cabin, cargo and power-plant space may be efficiently provided; and which may be landed slowly and safely under adverse conditions.

The invention is adapted both for the provision of huge cargo or passenger transport craft and of fast racing or pursuit planes capable of violent maneuvers and extremely fast power dives.

Since certain changes may be made in the above construction and different embodiments of the invention could be made without departing from the scope thereof, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention, which as a matter of language, might be said to fall therebetween.

Having described my invention, what I claim as new and desire to secure by Letters Patent is:

1. An aircraft comprising wing and body portions, each shaped to provide an airfoil, the upper and lower cambers of said airfoils being substantially symmetrical, and control members extending laterally from the tail of the body portion and from the tips of the wings, each control member being pivoted on an axis extending substantially along its line of center of pressure, said wing portions having a certain totality of dynamic characteristics which is independent of the position of said control members which extend laterally from said tail.

2. An aircraft comprising wing and body portions, each shaped to provide an airfoil, the upper and lower cambers of said airfoils being substantially symmetrical and said wing portions being faired into said body portions, the points of center of pressure throughout the wing and body portions falling in a substantially continuous line, substantially symmetrical control members of definite thickness extending laterally from the tail of said body portion and from the tips of the wing portions and pivoted on axes extending substantially along their lines of center of pressure, said wing portions having a certain totality of dynamic characteristics which is independent of the position of said control members which extend laterally from said tail.

3. An aircraft comprising wing and body portions, each shaped to provide an airfoil, the upper and lower cambers of said airfoils being substantially symmetrical, and control members extending laterally from the tail of the body portion and from the tips of the wings, each control member being pivoted on an axis extending substantially along its line of center of pressure, said control members extending from the tail of the body portion being spaced from the respective wing portions and being at such a distance from said respective wing portions that the operation of said tail control members is substantially without effect upon the aerodynamic flow past said wing portions.

4. An aircraft comprising wing and body portions, each shaped to provide an airfoil, the upper and lower cambers of said airfoils being substantially symmetrical, and control members extending laterally from the tail of the body portion and from the tips of the wings, each control member being pivoted on an axis extending substantially along its line of center of pressure, each of said wing portions having an arcuate leading edge and an arcuate trailing edge.

5. An aircraft comprising wing and body portions, each shaped to provide an airfoil, the upper and lower cambers of said airfoils being substantially symmetrical, and control members extending laterally from the tail of the body portion and from the tips of the wings, each control member being pivoted on an axis extending substantially along its line of center of pressure, each of said wing portions having an arcuate leading edge and an arcuate trailing edge, said arcuate leading edges being faired into said body portion and the forward end of said body portion extending forward farther than said wing portions.

6. An aircraft comprising wing and body portions, each shaped to provide an airfoil, the upper and lower cambers of said airfoils being substantially symmetrical, and control members extending laterally from the tail of the body portion and from the tips of the wings, each control member being pivoted on an axis extending substantially along its line of center of pressure, said control members which extend from the tips of said wing portions being tapered with the smaller end away from the respective wing.

7. An aircraft comprising wing and body portions, each shaped to provide an airfoil, the upper and lower cambers of said airfoils being substantially symmetrical, and control members extending laterally from the tail of the body portion and from the tips of the wings, each control member being pivoted on an axis extending substantially along its line of center of pressure, said control members which extend from the tips of said wing portions having leading and trailing edges which are substantially continuous with the leading and trailing edges of the respective wing portions.

8. An aircraft comprising wing and body portions, each shaped to provide an airfoil, the upper and lower cambers of said airfoils being substantially symmetrical, and control members extending laterally from the tail of the body portion and from the tips of the wings, each control member being pivoted on an axis extending substantially along its line of center of pressure, said control members which extend from the tips of said wing portions having leading and trailing edges which are substantially continuous with the leading and trailing edges of the respective wing portions, and having leading and trailing edges which extend backwardly as well as laterally.

9. An aircraft comprising wing and body portions, each shaped to provide an airfoil, the upper and lower cambers of said airfoils being substantially symmetrical, and control members extending laterally from the tail of the body portion and from the tips of the wings, each control member being pivoted on an axis extending substantially along its line of center of pressure, each of said control members, which extend from the tips of said wings, having a part of its periphery adjacent a part of the adjacent wing, said adjacent parts of each control member and wing being defined by a backwardly-extending, substantially straight line.

ALFRED C. LOEDDING.